Patented June 17, 1930

1,765,134

UNITED STATES PATENT OFFICE

BRADLEY DEWEY, OF CAMBRIDGE, AND ERNEST C. CROCKER, OF BELMONT, MASSACHUSETTS; SAID CROCKER ASSIGNOR TO SAID DEWEY

SEALING COMPOSITION

No Drawing. Application filed June 10, 1924. Serial No. 719,129.

This invention relates to compositions of latex (water emulsions of rubber, either natural latex or artificial water-dispersed rubber) adapted to such purposes as involve deposition and distribution on surfaces of solids, as for instance sealing joints or seams, as of cans, and has for its prime objects: first, plastic behavior of the composition as and when deposited on a container member which is to be sealed to another container member, that is to say, such inherent resistance to flow and deformation under the usual conditions of mechanical handling of such container members that the deposited composition will, though sufficiently fluid to be readily applied —as by an extrusion machine,—retain its volumetric distribution unaltered and therefore ultimately become set by relative solidification in that original and intended distribution; second, such selected, predetermined, or adjusted viscosity of the composition in its state as and when applied, as to a container member, as serves to regulate its rate of flow, under moderate pressure differential, as from an extrusion apparatus.

Solutions of rubber in any of the recognized solvents, having a viscosity greater than that represented in the viscosity obtained with one half pound of rubber per gallon of solvent usually give difficulties in manipulation in the ordinary applying machines. Bearing in mind that the amount of solid material that can be included in the groove in the end of the can in one application is restricted to the solid that may be deposited from a solution which completely fills this groove, it will be observed that the low rubber content of a solution containing one-half pound per gallon materially restricts the amount of rubber that can be used for sealing the can end upon evaporation of the solvent. Furthermore, solutions of rubber alone are so stringy or viscous that in practice from 15% to 50% (based upon the weight of rubber) or more of waxes such as paraffin or beeswax are added to render the solution applicable in the ordinary types of machines. Rubber, with its unique characteristics of resilience and elasticity is by itself the best sealing medium and these additions, which may accelerate ageing of the film or softening under the heat of processing, do not increase the sealing efficiency of the residual gasket, but may be regarded as a necessary evil to permit of the successful use of rubber solutions for this work.

In many important respects latex possesses characteristics which render it an admirable material for sealing purposes; being an emulsion (either natural or artificial) of globules of rubber in water, which when dried forms a semi-solid, elastic mass of high tensile strength. But in its fluid and manipulable state, latex flows too readily to be and to remain evenly distributed over a surface (such as the channeled rim of a can-cover) to which it is applied, if the usual practical requirements of rapid manufacture and quantity-production are to be met.

So far as concerns the flow of latex through an orifice, the difficulties of application to sealing surfaces may be obviated and controlled by adding to the latex-emulsion a factor to increase viscosity, such as a solution of a gum which has a mucilaginous character when extended in water; but this alone will not solve the problem under practical manufacturing conditions, because the viscosity-factor while controlling does not eliminate fluidity and thus does not prevent unequal distribution of the sealing composition on the seal-surface, unless precaution be taken to maintain that surface horizontal.

Plasticity is the characteristic required to ensure retention of uniform distribution of the sealing material upon the seal-surface until its liquid constituents have evaporated and its deposit has assumed a substantially solid consistency. A substance is plastic which changes conformation in response to pressure above a critical degree peculiar to the given substance, but which retains conformation when pressure upon it falls below the critical degree. Thus the addition to latex of a substance which is characterized by the capacity to increase plasticity will not prevent the resulting composition from flowing through a given aperture or nozzle in response to pressure in excess of a definite critical pressure, but, acting as a plasticity-factor, will prevent or tend to prevent the composition from flowing when such pressure is withdrawn. Thus, latex to which a proper portion of plasticity-increasing material has been added, is applicable to a seal-surface by a jet or stream caused by pressure, but will remain on the surface without further flow, since after deposit all appreciable pressure-differential is absent.

Preferably, to secure the best uniform results in manufacturing practice, we modify a latex by the addition of both a viscosity-increasing factor and a plasticity-increasing factor, utilizing the former as a controller or regulator of flow during the application of the composition to a seal-surface, and the latter as a preventive of flow and uneven distribution of the sealing composition after application and during the drying period. For this purpose, in accordance with the present invention, certain viscosity increasing agents, such as mucilaginous gums, may be added to the emulsion, which are of such properties and in such condition as to leave the characteristic features of the latex essentially unchanged but which superimpose upon it an additional degree of viscosity. As a representative of the gums which are suitable for this purpose, gum karaya may be mentioned. Other viscosity-factors may be employed.

Since viscosity is peculiarly the property of a fluid, and for most practical considerations, that of a liquid, the viscosity increasing factor introduced into a latex-emulsion should disperse therein as a liquid phase. Since, also, this invention relates to compositions of which latex emulsion is the base material, liquid-phase emulsoids electrically similar to the rubber dispersion constitute the category of equivalents; electropositive liquid-phase emulsoids would coagulate the rubber dispersion, which is electronegative, and therefore incapacitate the composition to perform its intended functions or to remain amenable to the action of extrusion apparatus.

The desired plasticity (in the sense hereinabove defined) will be imparted to a latex emulsion by adding thereto a measured quantity or proportion of the naturally colloidal or colloidized earth known as bentonite. This material occurs in nature in the form of a friable aggregate or powdery substance, of which the inorganic constituents are, chiefly, calcium carbonate and aluminum silicate. The particles are wholly or predominantly of colloid dimensions; but, in addition to colloidal dispersibility in a liquid medium such as water, bentonite possesses in marked degree the property of swelling on application of water, a phenomenon quite distinct from simple dispersibility of solid particles of colloid dimensions. The presence in bentonite of a colloidal component, doubtless organic, has been demonstrated. Under suitable conditions of temperature and atmospheric humidity, decomposition and putrefaction of bentonite takes place. If bentonite be heated at temperatures destructive of organic material, the mineral residue, while still composed of particles of colloid dimensions, and dispersible in water, no longer manifests the swelling phenomenon. The hydrophilic or swelling-in-water colloid component has been eliminated.

According to Wolfgang Ostwald (Theoretical and Applied Colloid Chemistry, N. Y., John Wiley & Sons Inc.: pp. 52, 86, 101–108) the swelling colloid dispersions undergo "solvation," that is to say penetration and dilation of the dispersed particles themselves by the liquid of suspension, which carries the dispersion eventually into liquid phase. A swelling colloid dispersion, by itself therefore becomes emulsoid, as distinguished from the suspensoid character of stably solid particles of colloid dimensions, (Ostwald p. 40). In dilute dispersion, the suspension of stably solid, definitely bounded (with respect to the suspension medium) colloid dimensioned particles alone manifests no plasticity, that is to say, no capacity to resist flow in response to pressure differential; and likewise, a dilute dispersion of a swelling colloid, out of association with suspensoid particles, manifests mainly the properties of a liquid phase in emulsion.

In relation to a latex, or emulsion of rubber and water, a swelling colloid must be one which disperses in its characteristic manner, in water; that is to say, must be hydrophilic. The swelling colloid component of bentonite answers to this requirement.

For the purposes and objects of this invention, we recommend a dispersion of approximately 14% bentonite and 86% by water, of weight. If about twelve parts (by weight) of this dispersion be added to about seventy parts of latex and thoroughly mixed with gentle stirring, to avoid mechanically induced coagulation or inclusion of air bubbles, the resulting liquid composition will manifest marked plastic property, in the sense herein defined.

In preparing a compound for sealing canned foods, in accordance with the present invention, a rubber-like emulsion in water is preferably employed, such as rubber latex. When natural rubber latex is employed, it may be as freshly obtained from the rubber tree, but where it is to be conveyed to a distance, 1% to 3% of a water solution of ammonia containing approximately 23% of ammonia gas is preferably added. Other materials than ammonia having a preservative action upon the latex may be employed such as oils, or approximately 1% of a 40% solution of formaldehyde. Normal latex usually contains approximately 65% of moisture and 35% of solid constituents. A greater or less amount of moisture may be naturally present or may be added or evaporated as desired.

The expression "rubber latex" or "latex" and similar expressions contained herein as descriptive of materials to which this invention may be applied, are intended to include not only the natural latex of rubber trees such as *Hevea brasiliensis*, and the juices from which balata and gutta percha are derived, but also artificially prepared latexes or emulsions of similar characteristics such as those obtained by colloidizing various coagulated rubbers.

Increase of viscosity to a degree higher than that which characterizes latex is highly desirable and practically necessary in order to regulate and control the delivery of a plasticized latex, as by extrusion apparatus, under the moderate pressure differentials of practice.

Water soluble gums or other substances, characterized by the ability to disperse and to develop a suitable degree of viscosity in the resulting liquid, will in general be applicable for the purpose of the invention. But in addition it is to be observed that such substances should not be of themselves reactive with any of the other ingredients to be used to cause the formation of colloidal precipitates therein. Gums containing such substances as impurities are also to be avoided or must be treated before addition to the emulsion, in order to effect their removal or render them inactive. Otherwise, the emulsion itself may be coagulated prematurely.

Gum karaya meets these conditions especially satisfactorily and may be added directly to the emulsion if desired, but it is preferable to introduce it in the form of a water solution. For best results and greatest effectiveness in contributing to the viscosity of the emulsion, it has been found, as a part of the present invention, that gum karaya treated in water solution with an alkali or alkali salt, (preferably sodium carbonate) and allowed to digest or react therewith for a given length of time reaches a maximum of effectiveness.

In the instant case, a water solution or suspension of the gum karaya is prepared, containing approximately 3% by weight. To this about 2% by weight of soda ash is added. It will be found that by this treatment, most satisfactory results are obtained, and the smoothness of the gum solution is promoted. It is further found, by experiment and in actual experience, that this increase in smoothness reaches a critical or maximum value between 16 and 18 hours after the addition of the soda ash and that for most satisfactory results it should be diluted by mixing with the other constituents within this period.

To make the prepared sealing compound, possessing controlled viscosity for purposes of regulated application, and placticity for purposes of fixation in the form and distribution when applied, as to a container member, about 70 parts by weight of the latex-emulsion are added to a previously prepared mixture containing 12 parts of the water suspension of bentonite and 18 parts of the gum karaya solution, as described above. The resulting compound is thoroughly mixed, but unnecessary stirring or agitation is to be avoided, as it tends to coagulate the mixture and also to introduce air bubbles. The proportions used and the order and mode of treatment in preparing the compound may be considerably changed or modified, as desired, to meet the specific requirements of any given case. It is, however, advisable to add the latex-emulsion last.

Other materials may also be added to the compound in order to impart their characteristic values thereto. For example, it is usually necessary that the seal shall be colored so that during its application and subsequent inspection, it may be seen readily and distinctly. The visibility imparted to the sealing material by coloring matter is of substantial value, since by its aid it is easy to ascertain by quick inspection that the sealing material is thoroughly and uniformly distributed over the seal-surface. Suitable visible color may be imparted by adding to the composition finely ground red iron oxide moistened with water containing a little saponin.

The sealing compound thus obtained is distinctly fluid and will flow freely in large volumes. However in smaller volumes its marked viscosity is evident and if it is allowed to flow or drip from a stirring rod it gives evidence of cohesion without the "hairing" or stringiness usually encountered in solutions of rubber in the ordinary solvents, and which cause trouble during commercial application of rubber compounds unless counteracted by the addition of other materials such as waxes. Whenever the stream is broken or a drop separates from the rod, the freshly formed surfaces quickly close over or contract and the surface as a whole returns to its condition of equilibrium instantly. In relatively thick layers or drops, the compound tends, by reason of the plasticity-factor, represented by bentonite, to retain the configuration and disposition which has been initially impressed upon it, while in thinner layers or films its resistance to such change is greater. It will thus be found that the composition is sufficiently plastic to prevent substantial modification of its shape under slight pressure, such as its own weight, but if it be subjected to only a very small degree of superimposed pressure, the plasticity-factor will be overruled and the compound will exhibit plastic flow, limited only by the continuing restraint of its viscosity-factor.

Accordingly the representative composition, prepared as described above, may be conveniently directed under slight pressure through an orifice or tube and allowed to flow evenly upon the edges or surfaces of the material to be treated, or its physical characteristics are such that it can be applied to a revolving roll or wheel from which it may be transferred by any suitable means to the surface to be coated. It will remain within the areas to which it is thus applied and exhibit little or no tendency to shift or concentrate within such areas under gravity. The treated surfaces may therefore be horizontal or considerably inclined without disturbing the uniformity of the applied layer of sealing compound thereon. As the water content evaporates, the rubber-content of the latex will consolidate to form a uniform semisolid or solid elastic layer, having a thickness dependent upon the amount of compound applied.

It will now be apparent, that the plasticity characteristic of such sealing material is conditioned on the dispersion in the latex water, of stably solid particles of colloid dimensions, which are, as dispersed particles, predominantly and, it is believed, wholly associated with a hydrophilic colloid which by its property of swelling when dispersed in water gives the dispersion a consistency which the solid components of the respective composite particles, dispersed alone in the same weight proportion, could not impart. For this physical reason, the compound reconciles the property of ready flow under moderate pressure differential in excess of a critical value, and the property of plastic immobility when pressure differential below that value ceases to exist.

Water dispersible suspensoids, comprising particles of stably solid material of colloid dimensions, inert to the rubber dispersion of latex because electrically similar thereto, are known in considerable number; likewise hydrophilic colloids. A hydrophilic colloid, beside acting as a protective, may actually reverse the electrical sign normal to a suspensoid material. The non-coagulant property of the plasticity conferring ingredient taken as a whole, is the essential.

It will be apparent that numerous modifications and applications of this invention may be made by those skilled in the several arts where this or analogous functions are to be performed. The particular use thereof which has been described is, however, substantially representative of its general character and is suggestive of such adaptations which are accordingly to be considered as comprehended by the present disclosure and comprised by the following claims.

What we claim, and desire to secure by Letters Patent, is:

1. A sealing fluid, with viscosity increased by an admixture of gum karaya which has been treated with sodium carbonate, and rendered plastic by an admixture of bentonite.

2. A seal comprising as its basis dried latex, gum karaya and bentonite.

3. Sealing composition comprising an uncoagulated latex basis and solid suspensoid particles associated with a hydrophilic colloid dispersed in the latex in such proportions as to impart plasticity to the composition but leave it fluid in response to moderate pressure differential.

4. Sealing composition comprising an uncoagulated latex basis and solid suspensoid particles associated with a hydrophilic colloid dispersed in the latex in such proportions as to impart plasticity to the composition but leave it fluid in response to moderate pressure differential, and a water dispersible liquid phase colloid in such proportions as to impart viscosity to the composition of higher degree than that of the latex.

5. Sealing composition comprising a latex basis and bentonite dispersed therein in such proportion as to impart plasticity to the composition but leave it fluid in response to moderate pressure differential.

6. Sealing composition comprising a latex basis and bentonite dispersed therein in such proportion as to impart plasticity to the composition but leave it fluid in response to moderate pressure differential, and gum karaya dispersed therein in such proportions as to impart viscosity to the composition of higher degree than that of the latex.

7. Sealing composition comprising a latex basis and bentonite dispersed therein in such proportion as to impart plasticity to the composition but leave it fluid in response to moderate pressure differential, and gum karaya which has been treated with sodium carbonate, dispersed therein in such proportions as to impart viscosity to the composition of higher degree than that of the latex.

8. Sealing composition comprising an uncoagulated latex basis and solid earthy material suspensoid particles associated with a hydrophilic colloid dispersed in the latex in such proportions as to impart plasticity to the composition but leave it fluid in response to moderate pressure differential.

9. Sealing composition comprising an uncoagulated latex basis and solid earthy material suspensoid particles associated with a hydrophilic colloid dispersed in the latex in such proportions as to impart plasticity to the composition but leave it fluid in response to moderate pressure differential, and a water dispersible liquid phase colloid in such proportions as to impart viscosity to the composition of higher degree than that of the latex.

Signed by us at Boston, Massachusetts, this 9th day of June, 1924.

BRADLEY DEWEY.
ERNEST C. CROCKER.